United States Patent
Canady et al.

(10) Patent No.: US 8,088,347 B2
(45) Date of Patent: Jan. 3, 2012

(54) PROCESS FOR RECOVERING COPPER SULPHIDE FROM COPPER BEARING ORES BY FROTH FLOTATION

(75) Inventors: Daniel Canady, Humble, TX (US); Mark Dewald, Bayton, TX (US)

(73) Assignee: S.P.C.M. SA, Andrezieux Boutheon (FR)

( * ) Notice: Subject to any disclaimer, the term of this patent is extended or adjusted under 35 U.S.C. 154(b) by 0 days.

(21) Appl. No.: 12/920,848

(22) PCT Filed: Mar. 7, 2008

(86) PCT No.: PCT/IB2008/050844
§ 371 (c)(1),
(2), (4) Date: Sep. 3, 2010

(87) PCT Pub. No.: WO2009/109812
PCT Pub. Date: Sep. 11, 2009

(65) Prior Publication Data
US 2011/0020198 A1    Jan. 27, 2011

(51) Int. Cl.
*B03D 1/00* (2006.01)
(52) U.S. Cl. ............... 423/26; 423/53; 423/23
(58) Field of Classification Search ............ 423/26, 423/53, 23
See application file for complete search history.

(56) References Cited

U.S. PATENT DOCUMENTS

| | | | |
|---|---|---|---|
| 2,449,984 A | 9/1948 | Gibbs | |
| 2,919,025 A | 12/1959 | Booth | |
| 3,235,077 A * | 2/1966 | McGarry et al. | 209/166 |
| 3,570,772 A * | 3/1971 | Booth et al. | 241/24.13 |
| 4,040,950 A | 8/1977 | Zipperian | |
| 4,139,455 A | 2/1979 | Griffith | |
| 4,293,406 A | 10/1981 | Werneke | |
| 4,532,031 A | 7/1985 | Wang | |

OTHER PUBLICATIONS

International Search Report for PCT/IB2008/050844, dated Nov. 28, 2008.

* cited by examiner

*Primary Examiner* — Melvin Mayes
*Assistant Examiner* — Melissa Stalder
(74) *Attorney, Agent, or Firm* — Heslin Rothenberg Farley & Mesiti P.C.

(57) ABSTRACT

Process for recovering copper sulphide and optionally molybdenum sulphide from a copper bearing ore by froth flotation includes crushing said ore,
  mixing the obtained ground powder with at least a collector and water,
  aerating the slurry, and
  removing and concentrating the mineral froth formed at the surface of the bath, wherein the collector comprises a thioglycolic acid derivate having the following formula:

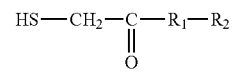

wherein R1 is N or O, and
R2 is an alkyl group having 2 to 12 carbon atoms.

11 Claims, No Drawings

PROCESS FOR RECOVERING COPPER SULPHIDE FROM COPPER BEARING ORES BY FROTH FLOTATION

CROSS REFERENCE TO RELATED APPLICATIONS

This application is a national stage filing under section 371 of International Application No. PCT/IB2008/050844, filed on Mar. 7, 2008, and published in English on Sep. 11, 2009, as WO 2009/109812, the entire disclosure of which is hereby incorporated herein by reference.

The present invention relates to improvements for the selective separation of the copper (Cu) and optionally copper-molybdenum(Cu—Mo) values from copper bearing ores by flotation. More particularly, the present invention relates to a process for such separation using as collector, a thioglycolic acid derivate, optionally in combination with any other collector commonly used in mining processes.

The majority of the world's copper resources are in the form of copper sulphide, in particular chalcopyrite ($CuFeS_2$) or chalcocite ($Cu_2S$). A sulphide is a compound in which a metal, such as copper, is bonded to one or more sulphur atoms.

For copper sulphides, froth flotation processes are widely used to separate copper sulphides from the remaining ore materials.

The art of froth flotation to separate and concentrate desired ores from undesirable minerals and gangue is a well-known process. Mineral ore is crushed and slurried with water to approximately 30% solids. Then, it is fed to the grinding mill where mineral collectors and frothers are added. The mineral collectors will adsorb onto the desired mineral's surface and cause the proper amount of hydrophobic characteristics to allow the desired mineral to stick to the frother bubble and be removed from the undesirable gangue material. Optionally, the person skilled in the art can add depressants to the flotation cell to further remove by settling undesirable species having tendency to stick to the frother bubbles such as iron. The ore/water slurry is then dosed with a given amount of frother on its way to the froth flotation cells. Air is blown up through the bottom of the flotation cell while an agitator keeps the heavy slurry well distributed. The air bubbles along with the frother create a mineral froth that is skimmed off the flotation cell, concentrated and further processed.

Typically, copper deposits contain other types of minerals associated with the copper sulphides. Molybdenite, for example, is a naturally occurring molybdenum sulphide ($MoS_2$) which is mainly recovered as a by-product in the refining of copper ores by froth flotation. Copper deposits also frequently contain significant amount of iron sulphide, which is an undesirable element in the final concentrate due to its deleterious effect to the equipment used for the reduction of copper sulphide ores to copper.

The economic performance of copper mineral is therefore directly linked with the effectiveness and selectiveness of the flotation process used. Accordingly, there is a constant need to provide improved froth flotation process that will allow the recovery of increased amount of highly pure valuable minerals from ores containing copper (i.e.: copper sulphide and optionally molybdenite).

The present invention relates to improved ore flotation processes. More specifically, the present invention relates to a novel collector material in froth flotation circuits to facilitate increased recovery of copper ore and optionally molydednum values with improved suppression of deleterious contaminants such as iron sulphide. More particularly, the present invention relates to a process for such recovery using as collector, in whole or in part, a thioglycolic acid derivate, optionally in combination with another common collector. The secondary collector can be dosed as a single homogeneous blend with the thioglycolic acid derivate or in two distinct points or as an heterogeneous formulations. Optionally, the mix of collectors as described hereinabove can efficiently be formulated with any other common froth flotation cell reagents such as frother, depressant, solvent, and emulsifier.

Most copper sulphide ores are concentrated using the froth flotation process.

Froth flotation is achieved when copper sulphide and optionally molybdenum sulphides particles are separated from other particles based on their surface potential.

For this, ground powdered ore is mixed with chemicals and water to form a slurry (or pulp). The chemicals used, known as collectors, are reagents containing both a non polar group (hydrocarbon radical) and a polar group (hydrophilic) so as the hydrophilic group can react with the copper sulphides and optionally molybdenum sulphides mineral to make it hydrophobic on its surface. The corresponding slurry is then aerated. The hydrophobic copper (Cu) or copper-molybdenum (Cu—Mo) bearing ore particles escape the water by attaching to the air bubbles, which rise to the bath surface forming a foam, called froth. After that, the froth is removed as a concentrate to be treated whereas the residue (hydrophilic particles) is discharged with the tailings stream.

Collectors commonly used for copper containing ores are xanthates, xanthate esters, xanthate formates, dithiocarbamates, phosphinates, dithiophosphates and thionocarbamates. However, for some cases the recovery and in particular the selectivity achieved are not satisfactory especially with regard to ores having high contents of iron sulphide.

BRIEF SUMMARY OF THE INVENTION

It is an object of this invention to provide an improvement in the process of recovering copper and, if any, also molybdenum values from a copper-bearing ore by froth flotation which comprises using as collector, in whole or in part, thioglycolic acid derivate, optionally in combination with another common collector.

Surprisingly, it has been found that the use of thioglycolic acid derivate(s) as unique collector or in combination with another common one dramatically improves the selective separation of copper (Cu) or copper-molybdenum(Cu—Mo) bearing ore especially in the case when there is high content of iron sulphide minerals in the pulp.

As a consequence the invention concerns a process for recovering copper sulphide and optionally molybdenum sulphide from a copper bearing ore by froth flotation consisting in:
crushing said ore,
mixing the obtained ground powder with at least a collector and water,
aerating the slurry,
removing and concentrating the mineral froth formed at the surface of the bath, wherein the collector is a thioglycolic acid derivate having the following formula:

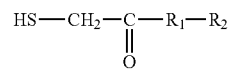

R1 represents N or O,
R2 represents an alkyl group having 2 to 12 carbon atoms.

In a preferred embodiment, the collector is an alkyl thioglycolate. In that case R1 represents an oxygen atom.

Whatever R1, R2 represents a linear alkyl chain, a branched alkyl, an aryl alkyl, an ethoxylated alkyl all of them having advantageously 2 to 12 carbon atoms, more advantageously having 6 to 10 carbon atoms, or any modified alkyl group having 2 to 12 carbon atoms, advantageously having 6 to 10 carbon atoms.

For example, the collector of the invention is chosen from the group containing n-butyl thioglycolate, n-hexyl thioglycolate, n-octyl thioglycolate, 2-ethylhexyl thioglycolate or n-dodecyl thioglycolate.

In a preferred embodiment, the alkyl thioglycolate has a linear or branched alkyl group consisting of 8 carbon atoms. It is named octyl thioglycolate.

Thioglycolic acid derivate(s) of the invention may be used alone or as a mixture of two or more of them.

A preferred non limited process of manufacturing Thioglycolic acid derivate(s) of the invention is described as follow: thioglycolic acid is mixed with the desired substituted primary or secondary alcohol or N-substituted amine, depending on the nature of the desired thioglycolic acid derivate. Heat is applied as needed and optionally an acid catalyst such as sulphuric acid, methane sulfonic acid, para toluene sulfonic acid, a sulfonated resin can be added to enhance reaction rate. The water formed by product is removed by distillation continuously and thus all the thioglycolic acid is converted to the corresponding thioglycolic acid derivate.

The process of the invention can require in addition to the thioglycolic acid derivate, at least a second collector which is chosen from groups consisting of di-alkyl thionocarbamates, di-alkyl xanthogen formates, di-alkyl xanthogen esters, di-alkyl dithiophosphates, di-alkyl monothiophosphates, di-alkyl dithiocarbamates, phosphinates, or any of the xanthates.

The composition of the new collector involves 5 to 100% by weight of any $C_2$ through $C_{12}$ thioglycolic acid derivate, preferably 5 to 75%, the rest to 100% by weight consisting of at least one of the common mining collectors having C—S bond, a P—S bond, or an S=C—N bond such as collectors chosen from groups containing di-alkyl thionocarbamates, di-alkyl dithiocarbamates, phosphinates, di-alkyl xanthogen formates, di-alkyl xanthogen esters, di-alkyl dithiophosphates, di-alkyl monothiophosphates, or any of the xanthates. Thioglycolic acid derivate(s) of the invention work with all mining collectors which can be used alone or in combination. Optionally, the mix of collectors as described above can efficiently be formulated with any common flotation cell reagents such as but not limited to depressants, frothers, emulsifiers, solvents in any suitable ratio.

When used in combination with another common collector, in some cases, the thioglycolic acid derivate will not solubilize in it so it must be dosed as a secondary collector in some fashion to maintain the ratios stated above, up to and including 3 parts thioglycolic acid derivate to 1 part common collector. To the opposite, when the thioglycolic acid derivate can solubilise, the compositions of the present invention eliminate the need for separate additions, thus reducing the number of processing steps.

The thioglycolic acid derivate containing collectors composition showed a strong and favorable effect on high pyrite copper ores. The iron recovery in the bulk copper float was cut by 20 to 42%. The rejection of iron in the flotation cell equates to sizeable increases in the grade assays for copper and/or molybdenum in the concentrate.

Generally, the thioglycolic acid derivate is used in an amount varying from about 0.001 to about 0.1 kg of collector per ton of ore, preferably about 0.005 to about 0.05 kg per ton. Depending upon the particular copper ore processed, the optimum dosage can easily be determined by trial.

DETAILED DESCRIPTION

Standard Blasthole Float:

A standard lab froth flotation procedure has been applied for the evaluation of the performance of the various derivates of thioglycolates and as well as a couple of formulated collectors:

A—Materials and Equipment 1500 g sample/test run, 100%-10 mesh, 1500 ml mill water, Reagents: collectors depressants and frothers, Lime as needed, Make-up mill water, Large ball mill with grinding media (balls), Rolls connected to timer, Strainer and bucket, Denver float machine (small impeller), Minnovex MFT float cell 4.6 liter, Denver 750 ml float cell, Filter and filter paper, pH meter which has been calibrated prior to floating, micro liter syringes, Siphon hose and 600 ml beaker, Sample pans, drying oven B—Procedure Place 1500 g sample, 1500 ml mill water, and estimated amount of lime to bring pH to 9.0 in ball mill. Fasten lid and place on rolls for 10 min. After grinding, dump sample and balls through strainer into bucket to remove balls. Carefully wash sample from ball mill, balls, and strainer into bucket using mill water. Pour sample from bucket into 4.6 liter cell. Add enough mill water to bring level up to line. Weigh cell and record on float sheet. Place cell on float machine. Lower the impeller into cell and adjust the rpm to 1200. Turn on machine making sure that the air is shut off. Place pH probe into cell. Record the pH. Add lime to bring pH up to desired value (10.5). Record this pH. Remove pH probe. Add collectors, depressants and frothers. Give the sample two minutes conditioning time. Turn on air. Float sample for 15 minutes pulling concentrate from top of cell every 15 seconds. Rinse down sides as needed. Turn off air. Place pH probe in cell and record ending pH. Syphon 600 ml of tail slurry into beaker. Wet screen material through a 400 mesh screen. Ro tap the oversize material using 65, 150, and 400 mesh screens. Weigh each fraction and assay for Cu and Fe. Reduce rpm of machine to 900. Turn off agitator, raise impeller, wash any residue from impeller and sides of cell. Remove cell and rinse into a 4 liter beaker. Floc the slurry and filter when it has settled. Put rougher con into 750 ml cell. Place cell on float machine and lower impeller into cell. Put pH probe into cell. Record pH. Add lime to increase pH to 11.5. Record pH and grams of lime used. Remove probe. Turn on air and float for 5 min. Rinse sides as needed with mill water. Turn off the air. Place pH probe in cell and record pH. Turn off agitator, raise impeller, wash any residue from impeller and sides of cell. Remove cell from machine. Filter and dry samples for assay. Assay for T Cu, T Fe, Cu(Sol), Mo, and insol on the concentrate and cleaner tail.

Reference is now made to the following non-limiting examples.

Example 1

Ore Designation: Chalcocite ($Cu_2S$), Chalcopyrite ($CuFeS_2$), Pyrite ($Fe_2S$), Quartz

|  | Cu Recovery | Fe Recovery | Cu Grade Assay | Fe Grade Assay |
|---|---|---|---|---|
| Collector @ 19 grams per ton of ore | | | | |
| 80% Diisobutyl dithiophosphate/20% Diisobutyl monothiopbospbate blend | 89.4 | 6.6 | 7.63 | 13.3 |
| 40% Diisobutyl dithiophosphate/10% Diisobutyl monothiophosphate/50% Octyl thioglycolate blend | 89.4 | 3.8 | 10.32 | 10.44 |
| Collector @ 24 grams per ton of ore | | | | |
| 80% Diisobutyl dithiophosphate/20% Diisobutyl monothiophosphate blend | 89.8 | 6.9 | 7.44 | 13.59 |
| 40% Diisobutyl dithiophosphate/10% Diisobutyl monothiophosphate/50% Octyl thioglycolate blend | 89.7 | 3.7 | 10.51 | 10.38 |

From above example, one can illustrate the positive effect of octyl thioglycolate addition to DTP and MTP on purity of floated copper by improving selectivity to iron at both dosages

Example 2

Ore Designation: Chalcocite ($Cu_2S$), Chalcopyrite ($CuFeS_2$), Pyrite ($Fe_2S$)

| Formulated collector @ 26 grams per ton of ore | Cu Recovery | Fe Recovery | Cu Grade Assay | Fe Grade Assay |
|---|---|---|---|---|
| 100% Isopropylethyl thionocarbamate | 78.2 | 38.3 | 8.81 | 20.78 |
| 40% Isopropylethyl thionocarbamate/60% Octyl thioglycolate blend | 78.3 | 29.4 | 12.09 | 19.34 |
| 35% Isopropylethyl thionocarbamate/55% Octyl thioglycolate blend/10% Methyl isobutyl carbinol | 78 | 30.21 | 11.81 | 19.66 |
| 33% Isopropylethyl thionocarbamate/52% Octyl thioglycolate blend/10% Methyl isobutyl carbinol/5% Sodium hydrosulfide | 77.9 | 29.17 | 11.49 | 18.56 |
| 35% Isopropylethyl thionocarbamate/55% Octyl thioglycolate blend/10% Methyl isobutyl carbinol | 78 | 30.21 | 11.81 | 19.66 |

From above example, one can illustrate the positive effect of octyl thioglycolate on purity of floated copper for various formulations containing IPETC/OTG including mix with frothers and depressants

Example 3

Ore Designation: Chalcocite ($Cu_2S$), Chalcopyrite ($CuFeS_2$), Pyrite ($Fe_2S$), Galena

| Collector @ 24 grams per ton of ore | Cu Recovery | Fe Recovery | Mo Recovery | Cu Grade Assay | Fe Grade Assay | Mo Grade Assay |
|---|---|---|---|---|---|---|
| 100% Sodium isopropyl xanthate | 79.6 | 41 | 83.4 | 9.12 | 21.89 | 0.341 |
| 25% Sodium isopropyl xanthate/75% Octyl thioglycolate blend | 79.5 | 27.1 | 85.1 | 12.91 | 18.19 | 0.59 |
| 50% Sodium isopropyl xanthate/50% Octyl thioglycolate blend | 79.1 | 28.3 | 84.5 | 11.88 | 18.42 | 0.518 |
| 75% Sodium isopropyl xanthate/25% Octyl thioglycolate blend | 80.2 | 34.1 | 83.9 | 11.01 | 20.15 | 0.468 |
| 6 grams per ton 100% Sodium isopropyl xanthate + 18 grams per ton 100% Octyl thioglycolate (Dosed separately) | 79.4 | 27.2 | 85 | 12.88 | 18.11 | 0.6 |

From above example, one can illustrate the positive effect of octyl thioglycolate on purity of floated copper and molybdenum for various formulations containing SIPX/OTG in different ratios added as a blend or in two separates stages Example 4

Ore Designation: Chalcocite ($Cu_2S$), Chalcopyrite ($CuFeS_2$), Pyrite ($Fe_2$)

| Collector @ 24 grams per ton of ore | Cu Recovery | Fe Recovery | Mo Recovery | Cu Grade Assay | Fe Grade Assay | Mo Grade Assay |
| --- | --- | --- | --- | --- | --- | --- |
| 100% Isopropylethyl thionocarbamate | 82 | 49.3 | 46.7 | 6.87 | 22.55 | 0.336 |
| 40% Isopropylethyl thionocarbamate/60% Octyl thioglycolate blend | 84.3 | 37.12 | 60.49 | 7.4 | 17.62 | 0.479 |
| 40% Isopropylethyl thionocarbamate/60% Butyl thioglycolate blend | 82.5 | 38.6 | 59 | 7.08 | 18.3 | 0.404 |
| 40% Isopropylethyl thionocarbamate/60% Allyl thioglycolate blend | 84 | 39.2 | 59.9 | 7.32 | 18.8 | 0.459 |
| 40% Isopropylethyl thionocarbamate/60% Cresyl thioglycolate blend | 83.1 | 38.1 | 57.8 | 7.19 | 18.51 | 0.4 |
| 40% Isopropylethyl thionocarbamate/60% 3-mercapto-1(N-octyl)propionamide | 83.8 | 41 | 56.8 | 6.81 | 17.91 | 0.412 |

From above example, one can illustrate the positive effect of different substituted thioglycolate on purity of floated copper and molybdenum for various formulations containing IPETC and a substituted thioglycolate

The invention claimed is:

1. Process for recovering copper sulphide and optionally molybdenum sulphide from a copper bearing ore by froth flotation comprising:
   crushing said ore to obtain ground powder,
   mixing the obtained ground powder with a mix of collectors comprising at least a first and second collector and water to obtain a slurry,
   aerating the slurry,
   removing and concentrating mineral froth formed at a surface of the slurry,
wherein the first collector comprises a thioglycolic acid derivate having the following formula:

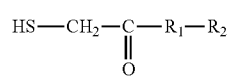

R1 is N or O,
R2 is an alkyl group having 2 to 12 carbon atoms,
wherein the second collector is chosen from the group consisting of di-alkyl thionocarbamates, di-alkyl xanthogen formates, di-alkyl xanthogen esters, di-alkyl dithiophosphates, di-alkyl monothiophosphates, di-alkyl dithiocarbamates, phosphinates, and any of the xanthates, and
wherein copper sulphide and optionally molybdenum sulphide are obtained.

2. Process according to claim 1, wherein R1 represents an oxygen atom.

3. Process according to claim 1, wherein R2 represents a linear alkyl chain, a branched alkyl, an aryl alkyl, or an ethoxylated alkyl.

4. Process according to claim 3, wherein R2 has 6 to 10 carbon atoms.

5. Process according to claim 1, wherein said first collector comprises a thioglycolic acid derivate chosen from the group consisting of n-butyl thioglycolate, n-hexyl thioglycolate, n-octyl thioglycolate, 2-ethylhexyl thioglycolate and n-dodecyl thioglycolate.

6. Process according to claim 1, wherein said first collector comprises octyl thioglycolate.

7. Process according to claim 1, wherein the mix of collectors contains 5 to 75% by weight of a thioglycolic acid derivate, the rest to 100% by weight comprising at least the second collector.

8. Process according to claim 7, wherein a ratio of thioglycolic acid derivate/second collector is up to and includes 3/1.

9. Process according to claim 1, wherein the mix of collectors is further formulated with other froth flotation reagents comprising at least one of depressants, frothers, emulsifiers, solvents.

10. Process according to claim 1, wherein the thioglycolic acid derivate is used in an amount varying from about 0.001 to about 0.1 kg of collector per ton of ore.

11. Process according to claim 10, wherein the thioglycolic acid derivate is used in an amount varying from about 0.005 to about 0.05 kg of collector per ton of ore.

* * * * *